(12) United States Patent
Gunugunuri et al.

(10) Patent No.: US 10,130,939 B2
(45) Date of Patent: Nov. 20, 2018

(54) CATALYST FOR DIRECT NOX DECOMPOSITION AND A METHOD OF FORMING AND USING THE CATALYST

(71) Applicant: Toyota Motor Engineering & Manufacturing North America, Inc., Erlanger, KY (US)

(72) Inventors: Krishna Reddy Gunugunuri, Ann Arbor, MI (US); Torin C. Peck, Ypsilanti, MI (US); Chen Ling, Ann Arbor, MI (US); Hongfei Jia, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/837,355

(22) Filed: Dec. 11, 2017

(65) Prior Publication Data
US 2018/0099264 A1    Apr. 12, 2018

Related U.S. Application Data

(62) Division of application No. 15/055,555, filed on Feb. 27, 2016, now Pat. No. 9,868,111.

(51) Int. Cl.
| | |
|---|---|
| *B01J 21/08* | (2006.01) |
| *B01J 23/44* | (2006.01) |
| *B01J 35/02* | (2006.01) |
| *B01D 53/94* | (2006.01) |
| *B01J 37/04* | (2006.01) |

(Continued)

(52) U.S. Cl.
CPC .......... *B01J 23/44* (2013.01); *B01D 53/9413* (2013.01); *B01J 21/08* (2013.01); *B01J 35/002* (2013.01); *B01J 35/006* (2013.01); *B01J 35/0013* (2013.01); *B01J 35/023* (2013.01); *B01J 37/035* (2013.01); *B01J 37/04* (2013.01);
(Continued)

(58) Field of Classification Search
CPC .......... B01J 23/44; B01J 35/023; B01J 21/08; B01D 53/945
See application file for complete search history.

(56) References Cited

U.S. PATENT DOCUMENTS

| | | |
|---|---|---|
| 2,662,861 A | 12/1953 | Riblett |
| 2,961,414 A | 11/1960 | LeFrancois |

(Continued)

FOREIGN PATENT DOCUMENTS

EP        0645171 A1    3/1995

*Primary Examiner* — Cam N. Nguyen
(74) *Attorney, Agent, or Firm* — Dinsmore & Shohl LLP (57) ABSTRACT

A process of forming a direct NOx catalyst includes the steps of providing a palladium salt, providing a silicon oxide support material, mixing the palladium salt and silicon oxide support material in an aqueous solution, evaporating the aqueous solution forming a solid, calcining the solid, and then exposing the calcined solid to a pretreatment gas at a specified temperature to form a desired direct NOx catalyst. When the process includes exposing the calcined solid to helium gas at a temperature of from 650 to 1000° C. the catalyst may include a mixture of palladium and palladium oxide having a particle size of from 5 to 150 nm where the palladium particles are discrete particles without sintering and the mixture may include 41% by weight palladium oxide and 51% by weight palladium metal.

9 Claims, 7 Drawing Sheets

(51) Int. Cl.
*B01J 37/03* (2006.01)
*B01J 37/08* (2006.01)
*B01J 37/18* (2006.01)
*B01J 35/00* (2006.01)

(52) U.S. Cl.
CPC ............ *B01J 37/08* (2013.01); *B01J 37/18* (2013.01); *B01D 2255/1023* (2013.01); *B01D 2255/30* (2013.01)

(56) References Cited

U.S. PATENT DOCUMENTS

| | | | |
|---|---|---|---|
| 3,850,847 A * | 11/1974 | Graham et al. ...... | B01D 53/945 423/213.5 |
| 5,128,114 A | 7/1992 | Schwartz | |
| 5,334,570 A * | 8/1994 | Beauseigneur .......... | B01J 23/40 502/240 |
| 5,352,645 A | 10/1994 | Schwartz | |
| 5,491,120 A * | 2/1996 | Voss ..................... | B01D 53/864 423/215.5 |
| 5,541,147 A * | 7/1996 | Friedlander .......... | B01D 53/945 502/100 |
| 6,207,610 B1 * | 3/2001 | Krause .................... | B01J 21/08 106/481 |
| 6,528,029 B1 * | 3/2003 | Dettling ............... | B01D 53/864 423/210 |
| 6,849,571 B2 | 2/2005 | Hoshino et al. | |
| 7,030,056 B2 | 4/2006 | Birke et al. | |
| 7,169,735 B2 * | 1/2007 | Sagae ...................... | B01J 23/44 502/240 |
| 7,422,731 B2 | 9/2008 | Nakatsuji et al. | |
| 7,563,744 B2 * | 7/2009 | Klein ................... | B01D 53/944 502/242 |
| 7,959,792 B2 | 6/2011 | Vaarkamp et al. | |
| 7,976,805 B2 | 7/2011 | Sobolevskiy et al. | |
| 8,080,494 B2 * | 12/2011 | Yasuda ............... | B01D 53/9413 502/261 |
| 8,158,257 B2 | 4/2012 | Koranne et al. | |
| 8,329,607 B2 * | 12/2012 | Kazi .................... | B01D 53/944 422/180 |
| 8,568,675 B2 | 10/2013 | Deeba et al. | |
| 8,679,434 B1 * | 3/2014 | Li ........................... | B01J 23/42 423/213.5 |
| 8,815,768 B2 | 8/2014 | Zhou et al. | |
| 8,937,203 B2 | 1/2015 | Zhou et al. | |
| 9,044,734 B2 * | 6/2015 | Grubert ................ | B01J 29/04 |
| 9,475,003 B2 * | 10/2016 | Hirose ................. | B01J 35/0013 |
| 9,480,973 B2 * | 11/2016 | Suzuki .................... | B01J 21/08 |
| 2003/0181324 A1 | 9/2003 | Hotta et al. | |
| 2004/0209770 A1 | 10/2004 | Nakatsuji | |
| 2013/0178666 A1 | 7/2013 | Zhou et al. | |
| 2013/0245335 A1 | 9/2013 | Zhou et al. | |
| 2015/0343423 A1 | 12/2015 | Hirose et al. | |

\* cited by examiner

CATALYST FOR DIRECT NOX DECOMPOSITION AND A METHOD OF FORMING AND USING THE CATALYST

CROSS-REFERENCE TO RELATED APPLICATION(S)

This application is a divisional of U.S. patent application Ser. No. 15/055,555 filed Feb. 27, 2016, the entire contents of which are incorporated herein by reference.

TECHNICAL FIELD

The invention relates to catalysts and with more particularity to direct NOx catalysts.

BACKGROUND

More stringent NOx emission requirements for combustion engines or processes may require catalytic NOx abatement technologies that are effective under various conditions. For example, catalytic NOx abatement technologies in order to meet higher government standards will need to be effective under lean burning conditions. Direct NOx decomposition to environmentally friendly components such as nitrogen and oxygen may be an alternative to current NOx traps and selective catalytic reduction currently used in the prior art. The use of an effective catalyst for direct NOx decomposition may eliminate the use of reducing agents and other complicated mechanisms to simplify the NOx removal process and decrease a cost for NOx abatement from the exhaust of various combustion processes.

Typical prior art catalysts require high operating temperatures such as greater than 700° C. to be effective for catalytic NOx abatement. There is therefore a need in the art for a catalyst that operates over a wide temperature range such as below 700° C. and may be utilized for direct NOx decomposition. There is a further need in the art for a catalyst that may be utilized for NOx abatement without any additional secondary reagents. There is also a need in the art for a catalyst that is effective to decompose NOx in a temperature range of emission gas from a gas or diesel engine.

SUMMARY

In one aspect, there is disclosed a process of forming a direct NOx catalyst that includes the steps of providing a palladium salt, providing a silicon oxide support material, mixing the palladium salt and silicon oxide support material in an aqueous solution, evaporating the aqueous solution forming a solid, calcining the solid, and exposing the calcined solid to helium gas at a temperature of from 650 to 1000° C. forming the direct NOx catalyst.

In another aspect there is disclosed a process of forming a direct NOx catalyst that includes the steps of providing a palladium salt, providing a silicon oxide support material, mixing the palladium salt and silicon oxide support material in an aqueous solution, evaporating the aqueous solution forming a solid, calcining the solid, and exposing the calcined solid to hydrogen gas at a temperature of from 300 to 1000° C. forming the direct NOx catalyst.

In a further aspect there is disclosed a direct NOx catalyst that includes a mixture of palladium, palladium oxide, and silicon oxide with the mixture having a particle size of from 5 to 150 nm where the palladium particles are discrete particles without sintering. The mixture may include 41% by weight palladium oxide and 51% by weight palladium metal.

In yet another aspect there is disclosed a process of decomposing NOx that includes the steps of providing a catalyst including a mixture of palladium, palladium oxide, and silicon oxide, and contacting the catalyst with a gas at least including NOx directly decomposing the NOx to form nitrogen, nitrogen oxide, or oxygen at a temperature of from 200 to 800° C.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

In one aspect, there is disclosed a process of forming a direct NOx catalyst that includes the steps of providing a palladium salt, providing a silicon oxide support material, mixing the palladium salt and silicon oxide support material in an aqueous solution, evaporating the aqueous solution forming a solid, calcining the solid, and then treating the calcined solid with a treatment gas at a specified temperature to form a desired direct NOx catalyst. Various treatment gases and processes include exposing the calcined solid to helium gas at a temperature of from 650 to 1000° C. forming the direct NOx catalyst. Another treatment gas and process includes exposing the calcined solid to hydrogen gas at a temperature of from 300 to 1000° C. forming the direct NOx catalyst. Another treatment gas and process includes exposing the calcined solid to oxygen gas at a temperature of from 50-650° C. forming the direct NOx catalyst.

In one aspect, the process may utilize palladium salts such as palladium nitrates, chlorides, or acetates. In one aspect, the calcining step may include exposing the solid to a temperature of from 450° C. to 650° C. for a time period of from 3 to 10 hours.

In one aspect, when the process includes exposing the calcined solid to helium gas at a temperature of from 650 to 1000° C. the catalyst may include a mixture of palladium and palladium oxide having a particle size of from 5 to 150 nm where the palladium particles are discrete particles without sintering. The mixture may include 41% by weight palladium oxide and 51% by weight palladium metal. The catalyst formed by the process may include a NOx conversion of from 20 to 40% at a temperature of from 300 to 500° C., as will be discussed in more detail below.

When the treatment process includes exposing the calcined solid to hydrogen gas at a temperature of from 300 to 1000° C. forming the direct NOx catalyst, the catalyst may include palladium particles having a particle size of from 50 to 2000 nm in size. The formed direct NOx catalyst may include a NOx conversion of from 10 to 50% at a temperature of from 300 to 800° C.

When the treatment process includes exposing the calcined solid to oxygen gas at a temperature of from 50-650° C. forming the direct NOx catalyst, the catalyst may include palladium oxide particles. The formed direct NOx catalyst may include a NOx conversion of from 0 to 25% at a temperature of from 650 to 800° C.

The catalyst produced by the various processes disclosed herein may be utilized to decompose NOx. The process of decomposing NOx may include providing a catalyst including a mixture of palladium, palladium oxide, and silicon oxide and then contacting the catalyst with a gas that includes at least NOx wherein NOx is directly decomposed to form nitrogen, nitrogen oxide, or oxygen at a temperature of from 200 to 800° C. The catalyst may include a mixture of palladium and palladium oxide having a particle size of from 5 to 150 nm where the palladium particles are discrete particles without sintering, as described above.

Examples

Figure 1:
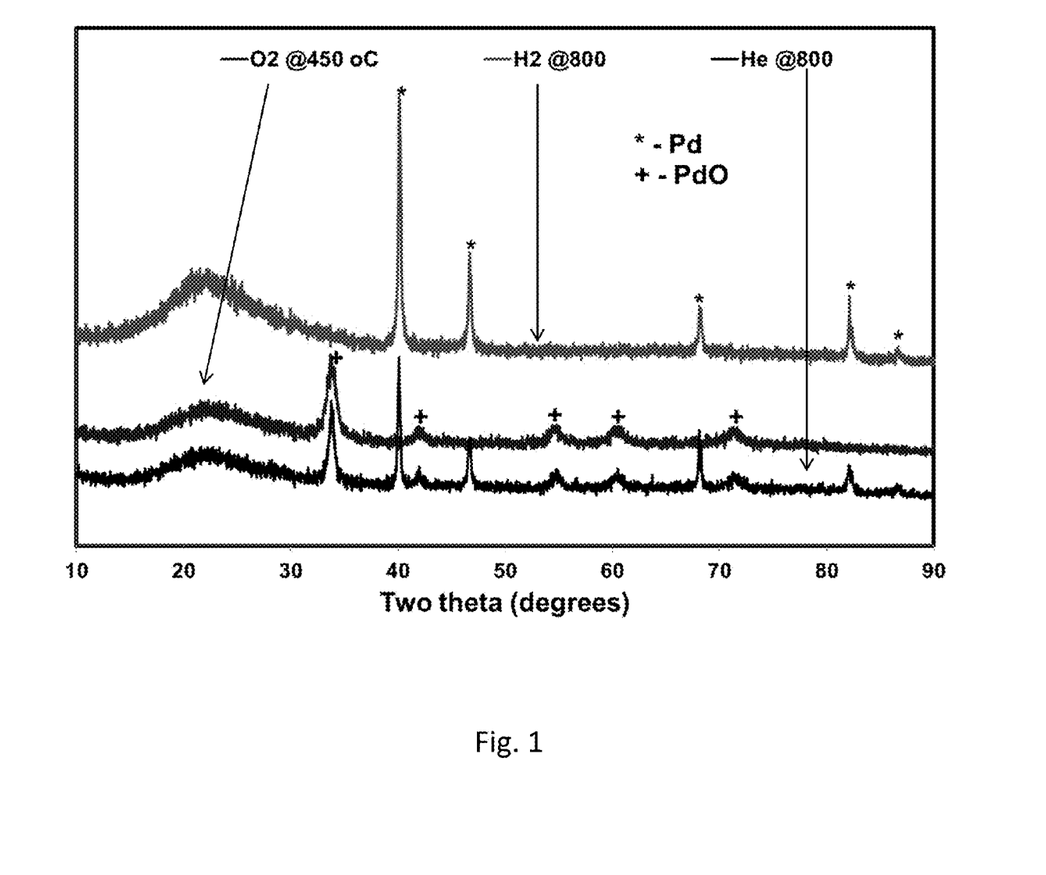
FIG. 1 is a plot of direct NOx catalysts produced by various processes including treatment with helium at 800° C., hydrogen at 800° C. and oxygen at 450° C.

Catalysts were synthesized by a wet impregnation method. 0.3247 grams of palladium nitrate (sigma-aldrich) was dissolved in 60 ml water and 3 grams of the H$_2$O-treated silicon dioxide (Cabot) was added to the aqueous solution. Then the solution was heated at 80° C. until water evaporated and was dried overnight at 120° C. Next, the solid material was calcined at a temperature of from 450° C. to 650° C. The calcined solid was then exposed to various treatment processes and conditions. The treatment processes include exposing the calcined solid to hydrogen gas at a temperature of 800° C. for 30 minutes time. Additionally, the treatment process includes exposing the calcined solid to helium gas at a temperature of 800° C. for 30 minutes time. Further, the treatment process includes exposing the calcined solid to oxygen gas at a temperature of 450° C. for 30 minutes Referring to FIG. 1, there is shown an x-ray diffraction plot of the catalyst samples after exposure to oxygen, helium, and hydrogen as described above. As can be seen in the plot, there is a clear diffraction peak corresponding to either palladium or palladium oxide or both materials. In one aspect, the oxygen treatment diffraction patterns describe a catalyst formed of 100% by weight palladium oxide. The helium treatment exposure results in a catalyst including 41% by weight palladium oxide and 59% palladium metal. The hydrogen treatment process includes a catalyst including 100% palladium metal.

Figure 2:
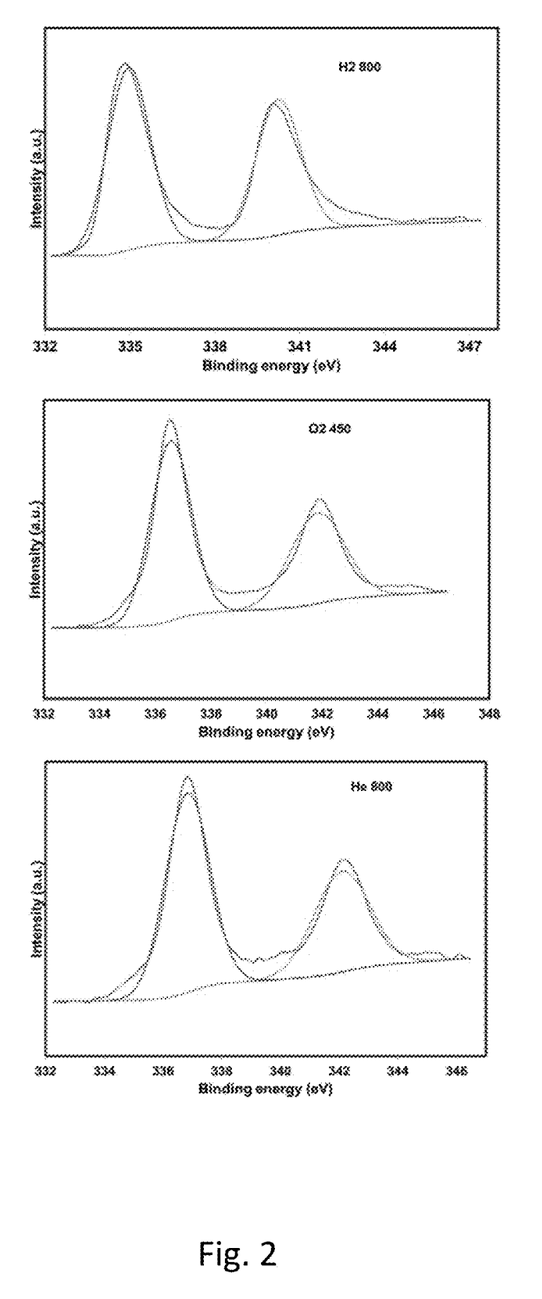
FIG. 2 is a plot of an x-ray photoelectron spectroscopy of the various direct NOx catalysts including various processes such as treatment with hydrogen at 800° C., oxygen at 450° C., and helium at 800° C.

Referring to FIG. 2, there are displayed XPS plots of the various catalysts formed by the treatments as described above. As can be seen in FIG. 2, the XPS plots show the successful synthesis of palladium and palladium oxide on a silicon dioxide support. The plots exhibit peaks corresponding to both palladium and palladium oxide in the XPS spectra.

Figure 3:
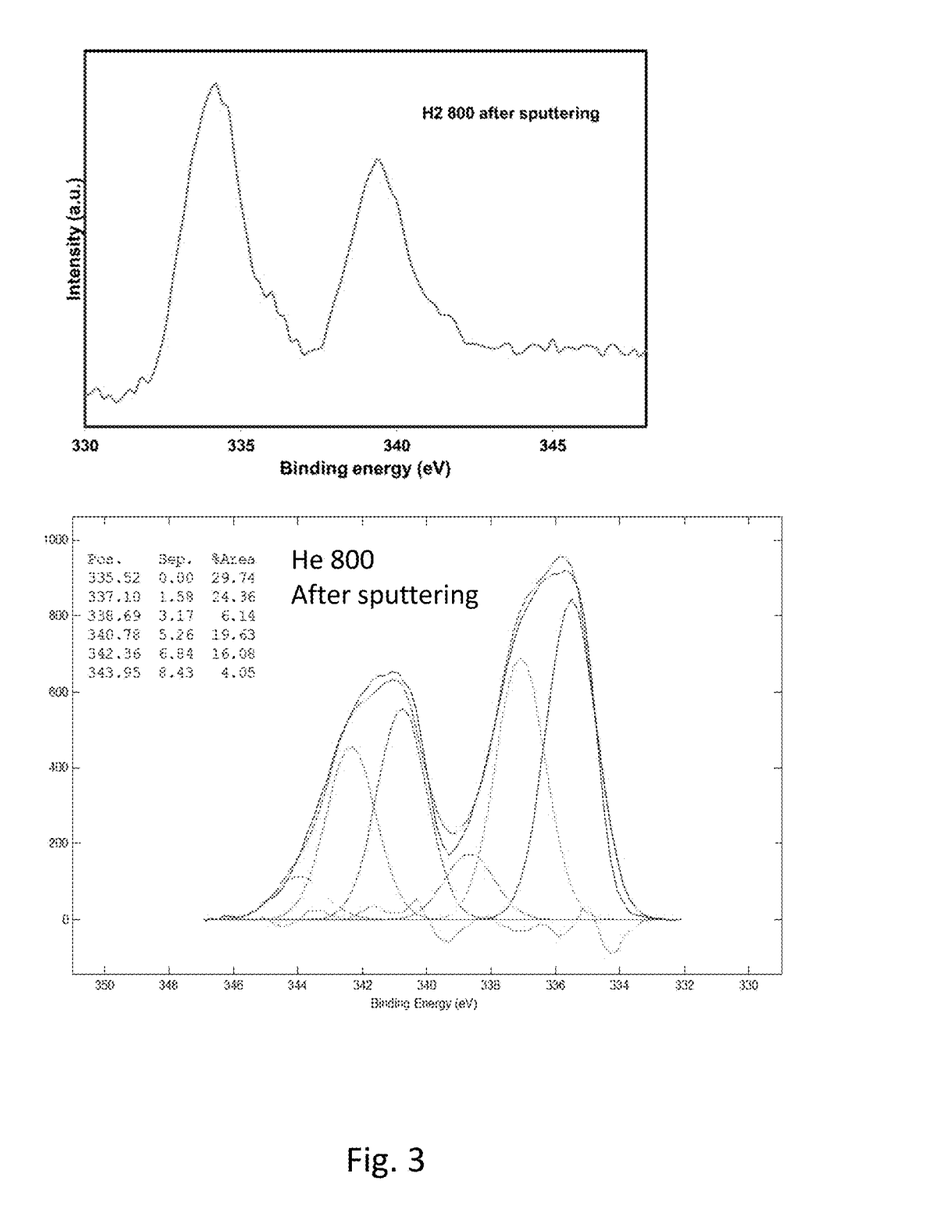
FIG. 3 is a plot of a photoelectron spectroscopy of catalysts treated with helium at a temperature of 800° C. and hydrogen at 800° C. both after sputtering.

Referring to FIG. 3, there is shown an XPS plot for samples of the catalysts after hydrogen and helium treatment processes as described above after a pre-sputtering step As can be seen in the plots, the hydrogen treated catalysts exhibit peaks due to palladium metal while the helium treatment catalysts exhibit peaks due to palladium metal and palladium oxide which corroborates the formation of a catalyst including a composite morphology that includes both palladium metal and palladium oxide.

Figure 4:
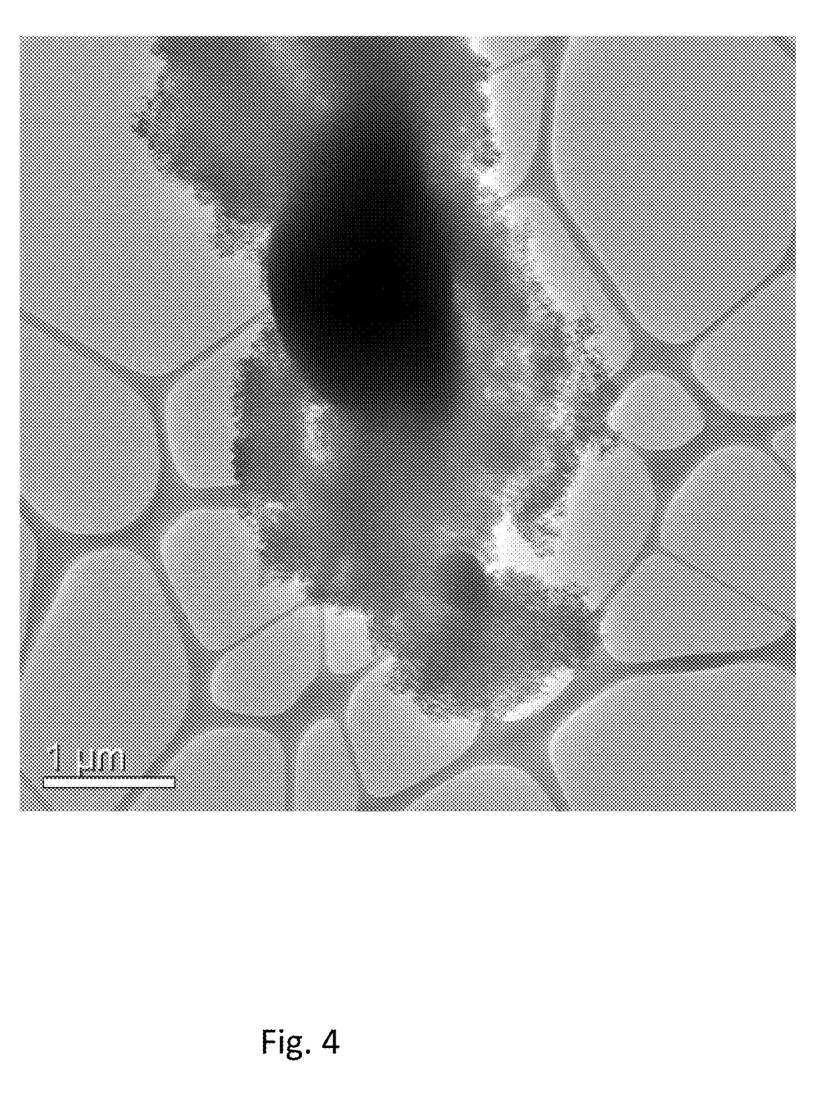
FIG. 4 is a TEM image of a palladium and silicon dioxide catalyst after treatment in the presence of hydrogen at 800° C.

Referring to FIG. 4, there is shown a TEM image of the catalyst formed after a hydrogen treatment process. As can be seen in the image, the formed direct NOx catalyst includes palladium particles having a particle size of from 50 to 2000 nm in size.

Figure 5:
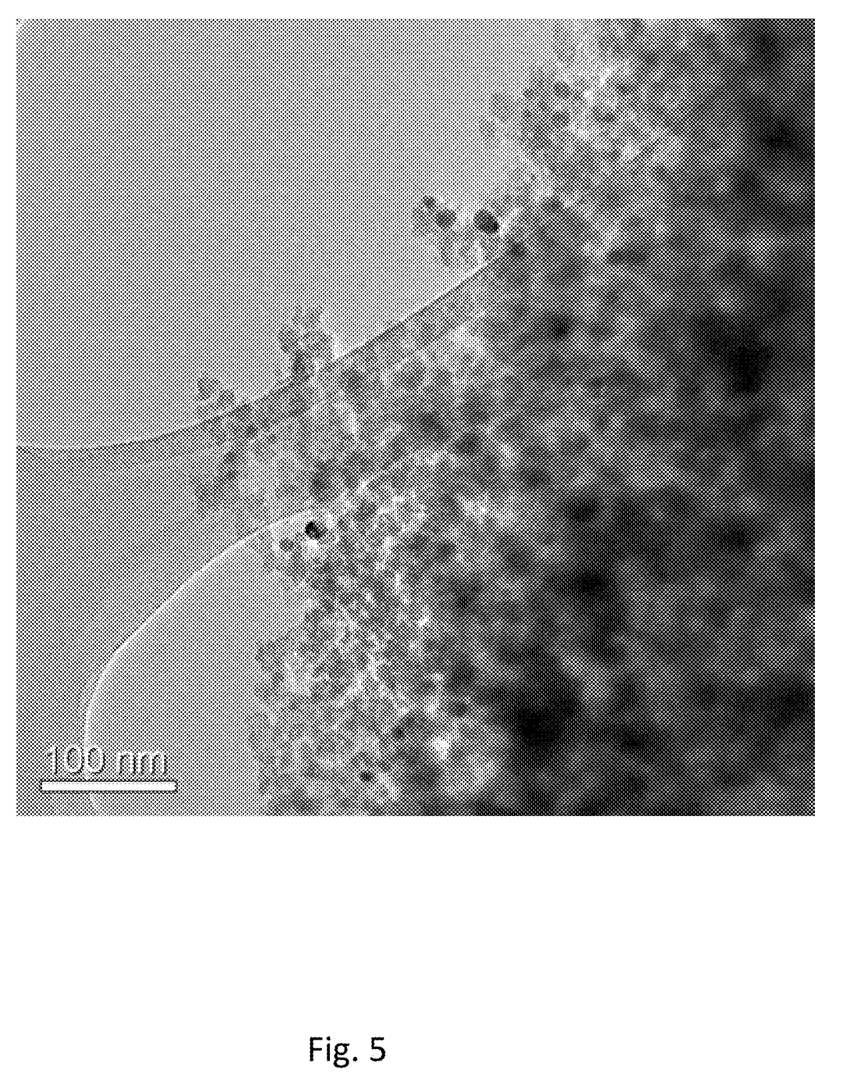
FIG. 5 is a TEM image of a palladium, palladium oxide, and silicon dioxide catalyst after treatment in the presence of helium at 800° C.

Referring to FIG. 5, there is shown a TEM image of a direct NOx catalyst formed by the helium treatment process as described above. As can be seen in the plot, the catalyst includes a mixture of palladium and palladium oxide having a particle size of from 5 to 150 nm where the palladium particles are discrete particles and are not sintered.

Figure 6:
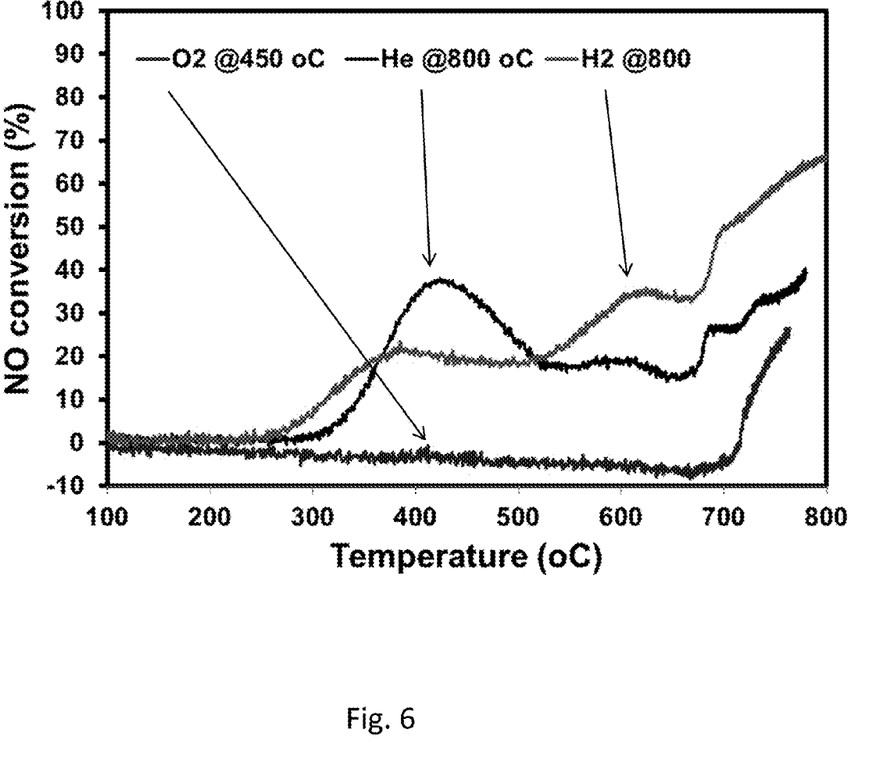
FIG. 6 is a plot of the NOx conversion as a function of temperature for catalysts exposed to various treatment environments including oxygen at 450° C., helium at 800° C., and hydrogen at 800° C.

NOx decomposition experiments were performed in a vertical fixed bed flow reactor. Before reaction, the various compositions or catalysts were created by the treatment processes as described above. After the treatment, the temperature of the catalysts was reduced to 100° C. and then 1% nitrogen oxide was introduced into the reactor by ramping the temperature from 100 to 800° C. Referring to FIG. 6, there is shown a plot of the NOx conversion efficiency for the various catalysts formed by the treatment processes. As can be seen in the plots, the catalysts exhibit a very good activity over a wide temperature range. Additionally it can be seen that the catalysts formed by the various treatments have differing NOx conversion percentages at different temperature ranges. In one aspect, the direct NOx catalyst formed by exposing the calcined solid to a helium gas at 800° C. has a NOx conversion of from 20 to 40% at a temperature range of from 300 to 500° C. Further, the direct NOx catalyst formed by exposing the calcined solid to hydrogen gas at a temperature of 800° C. has a NOx conversion of from 10 to 50% at a temperature of from 300 to 700° C.

Figure 7:
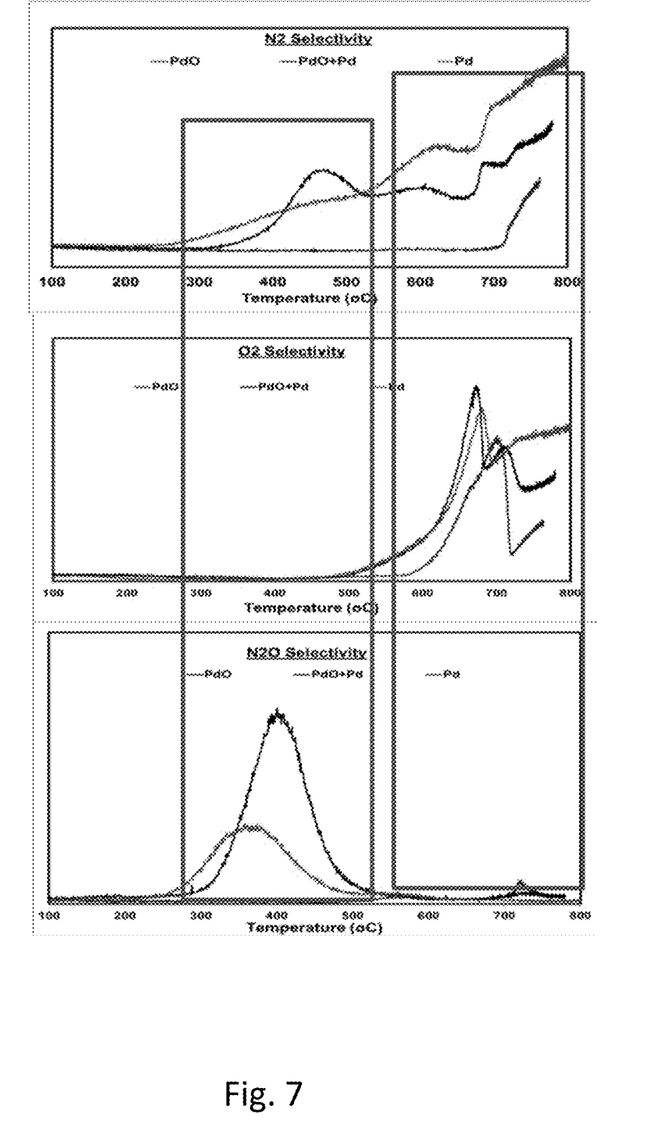
FIG. 7 is a plot of the decomposition products in a NOx abatement reaction for the various catalysts exposed to different treatment environments as a function of temperature.

Referring to FIG. 7, there is shown a plot of the selectivity of various decomposition components as a function of temperature for catalysts formed by the hydrogen treatment process and helium treatment process as described above. As can be seen, the reaction products of nitrogen and nitrogen oxide may be produced in a temperature region of from 300 to 500° C. whereas nitrogen and oxygen products may be formed at temperatures greater than 500° C. While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:
1. A direct NOx catalyst consisting of:
a mixture of palladium, palladium oxide and silicon oxide, said mixture having a particle size of from 5-150 nm, wherein the palladium particles are discrete particles without sintering.
2. The direct NOx catalyst of claim 1, wherein the mixture includes 41% by weight palladium oxide and 51% by weight palladium metal.
3. The direct NOx catalyst of claim 1, wherein the catalyst has a NOx conversion of from 20 to 40% at a temperature of from 300 to 500° C.
4. A process of decomposing NOx comprising
the steps of: providing a catalyst according to claim 1;
contacting the catalyst with a gas at least including NOx directly decomposing the NOx to form nitrogen, nitrogen oxide or oxygen at a temperature of from 200 to 800° C.
5. The process of claim 4, wherein the catalyst includes 41% by weight palladium oxide and 51% by weight palladium metal.
6. The process of claim 4, wherein the catalyst has a NOx conversion of from 20 to 40% at a temperature of from 300 to 500° C.
7. A direct NOx catalyst consisting of:
silicon oxide and palladium particles having a size of from 50-2000 nm wherein the palladium particles are discrete particles without sintering.
8. The direct NOx catalyst of claim 7, wherein the direct NOx catalyst has a NOx conversion of from 10 to 50% at a temperature of from 300 to 800° C.
9. A process of decomposing NOx comprising the steps of:
providing a catalyst according to claim 7;
contacting the catalyst with a gas at least including NOx directly decomposing the NOx to form nitrogen, nitrogen oxide or oxygen at a temperature of from 300 to 800° C.

* * * * *

UNITED STATES PATENT AND TRADEMARK OFFICE
CERTIFICATE OF CORRECTION

PATENT NO. : 10,130,939 B2
APPLICATION NO. : 15/837355
DATED : November 20, 2018
INVENTOR(S) : Krishna Reddy Gunugunuri et al.

It is certified that error appears in the above-identified patent and that said Letters Patent is hereby corrected as shown below:

In the Claims

In Column 6, Claim 7, Line 9, delete "50-2000 nm", and insert --50-2000 nm,--, therefor.

Signed and Sealed this
Twelfth Day of March, 2019

Andrei Iancu
*Director of the United States Patent and Trademark Office*